Feb. 5, 1946.  R. A. SOPP  2,394,525
MACHINE FOR EVERTING BALL CASINGS AND SIMILAR ARTICLES
Filed May 7, 1945  7 Sheets-Sheet 1

INVENTOR.
RICHARD A. SOPP
BY
ATTORNEY

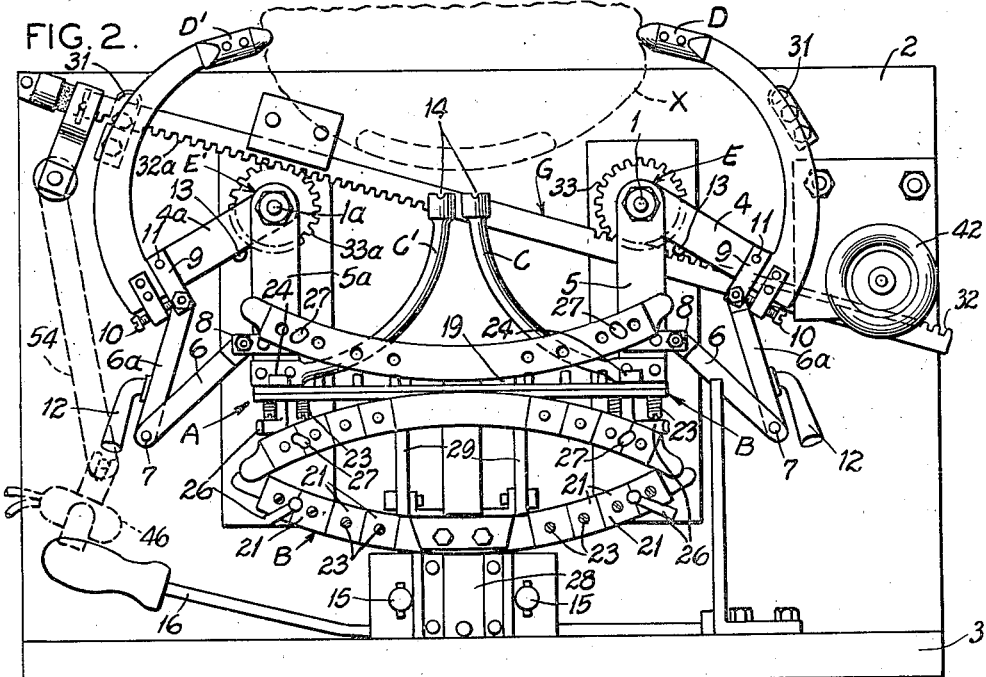

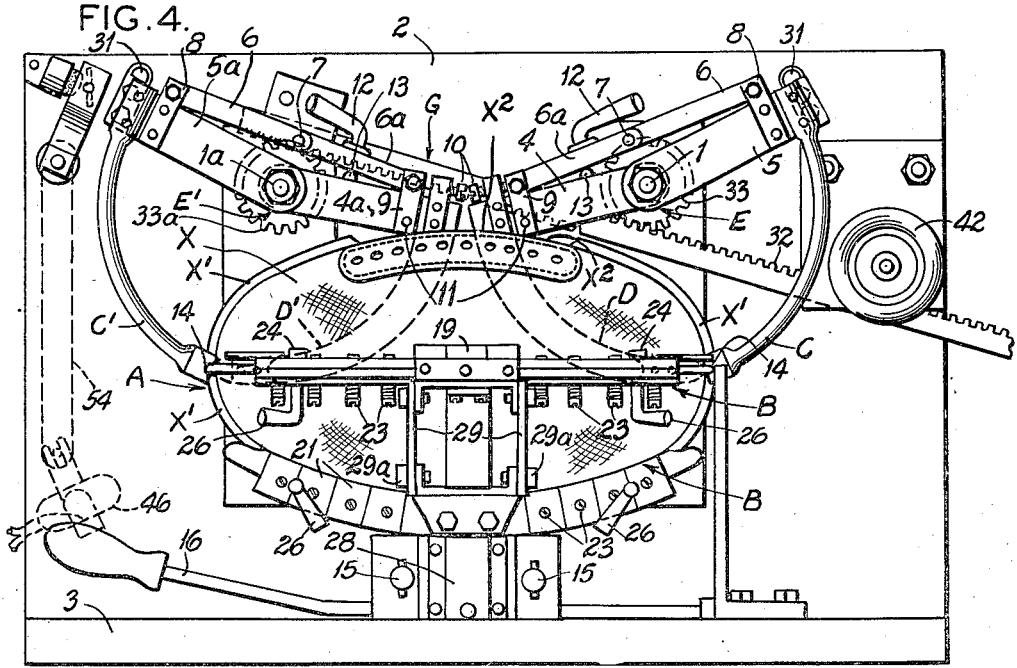
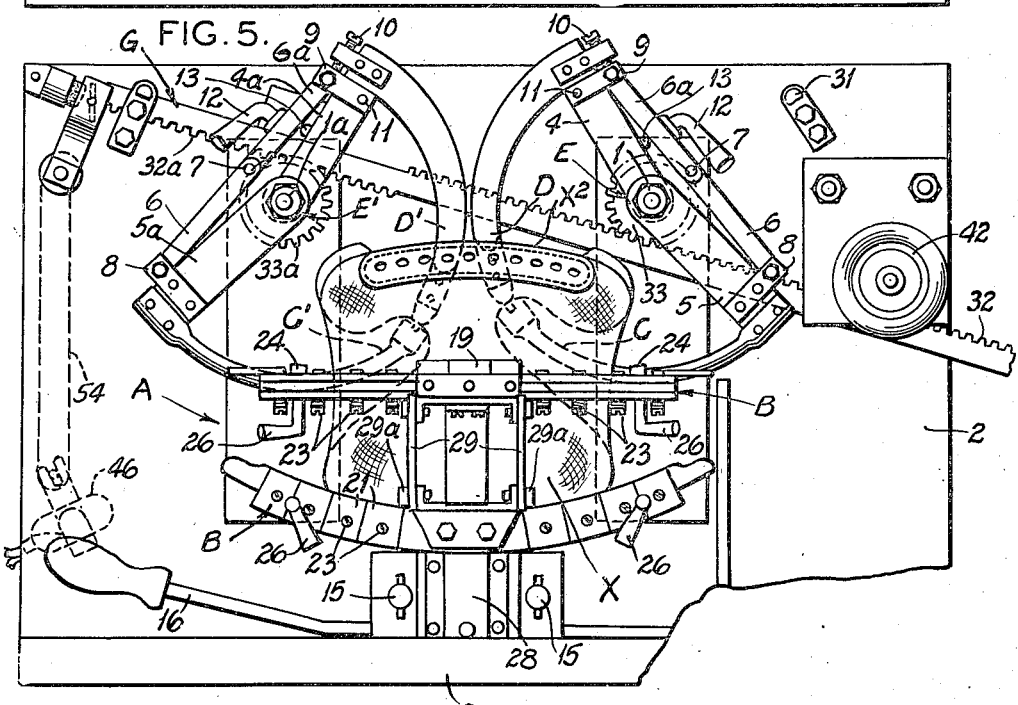

Feb. 5, 1946. R. A. SOPP 2,394,525
MACHINE FOR EVERTING BALL CASINGS AND SIMILAR ARTICLES
Filed May 7, 1945 7 Sheets-Sheet 4
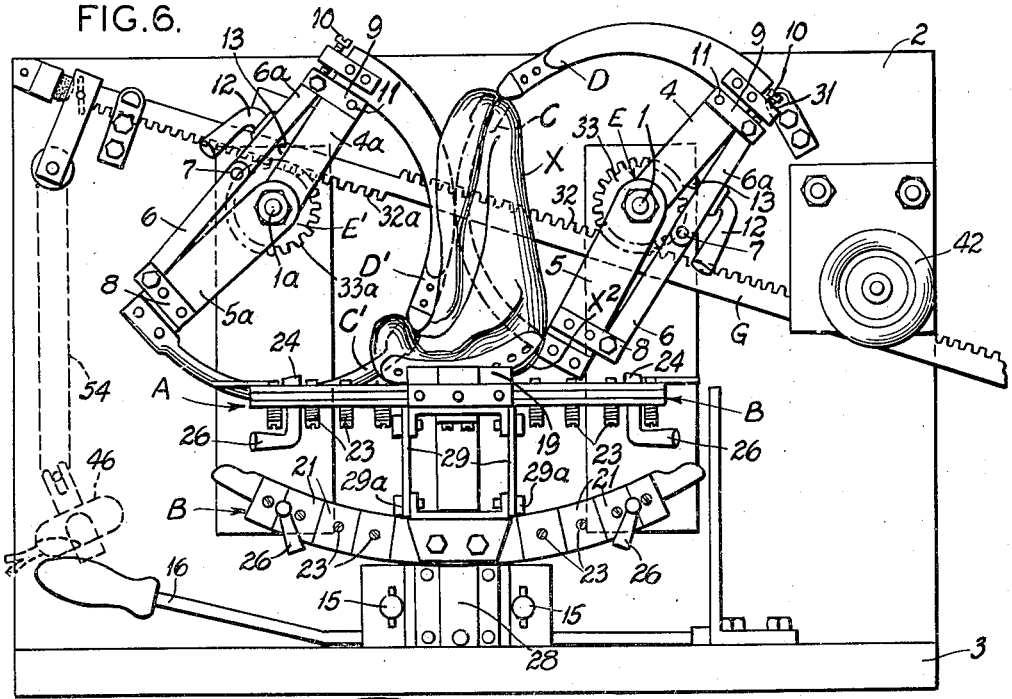
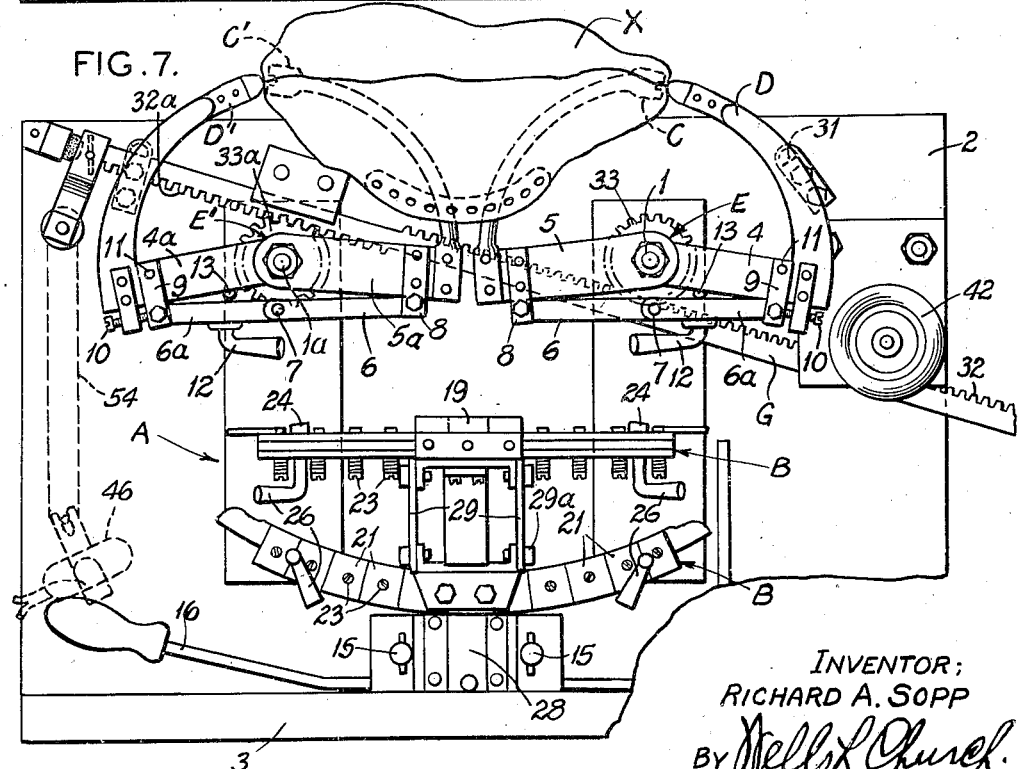
INVENTOR;
RICHARD A. SOPP
BY
ATTORNEY Feb. 5, 1946. R. A. SOPP 2,394,525
MACHINE FOR EVERTING BALL CASINGS AND SIMILAR ARTICLES
Filed May 7, 1945 7 Sheets-Sheet 5

INVENTOR.
RICHARD A. SOPP
BY Wells L. Church
ATTORNEY

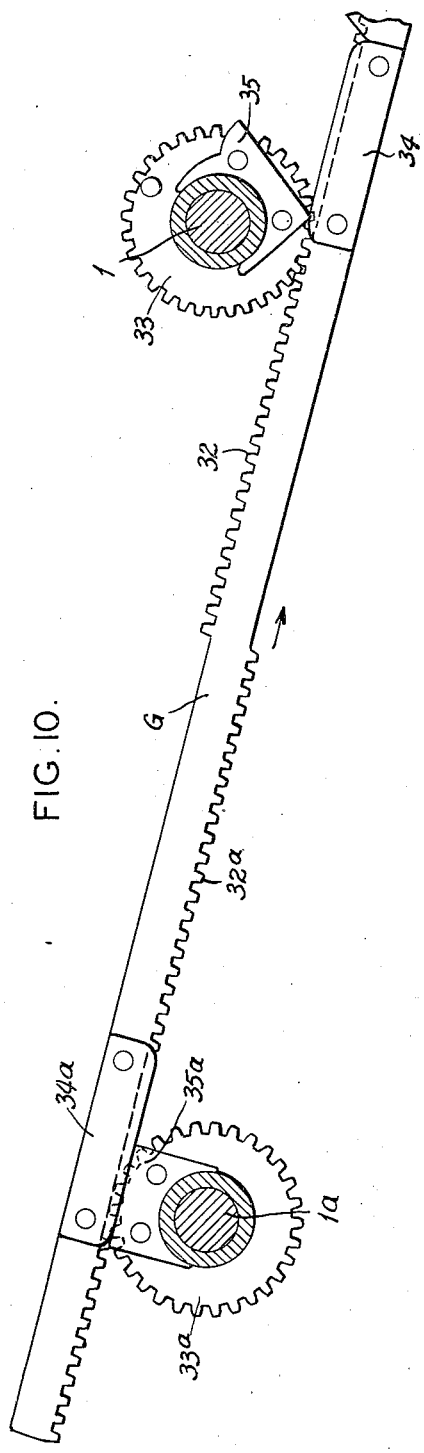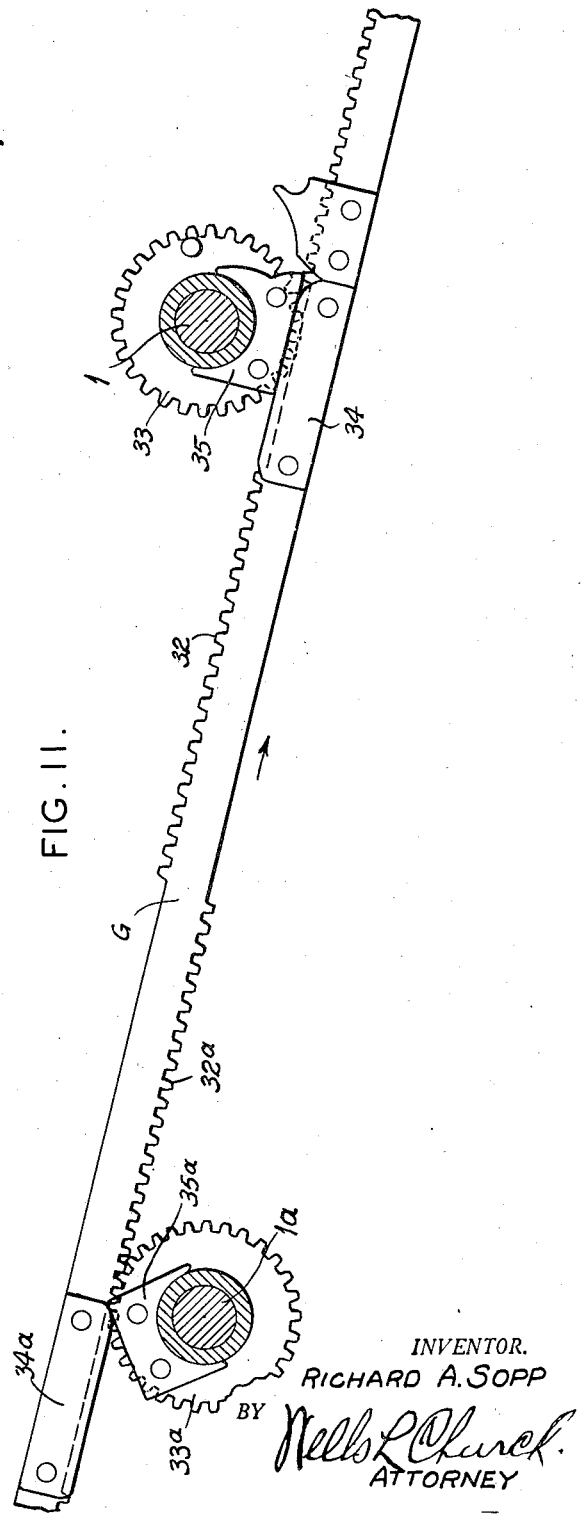

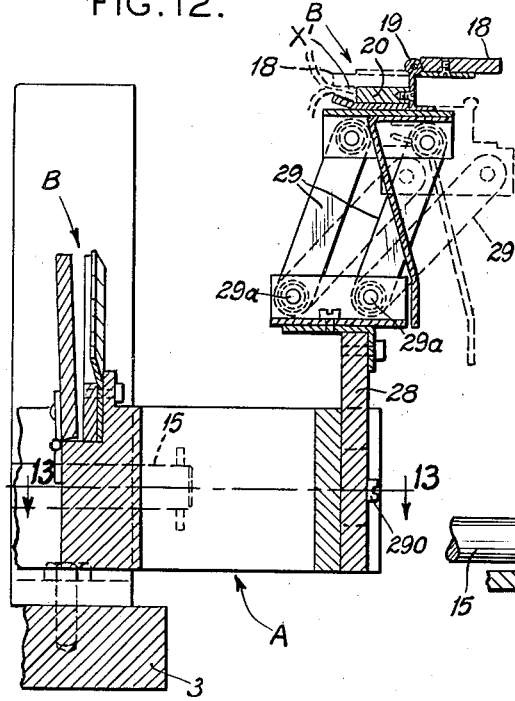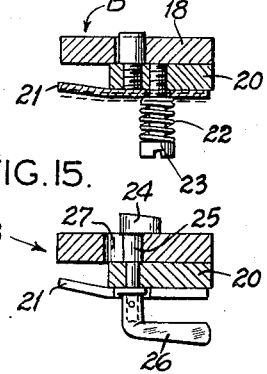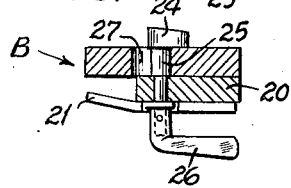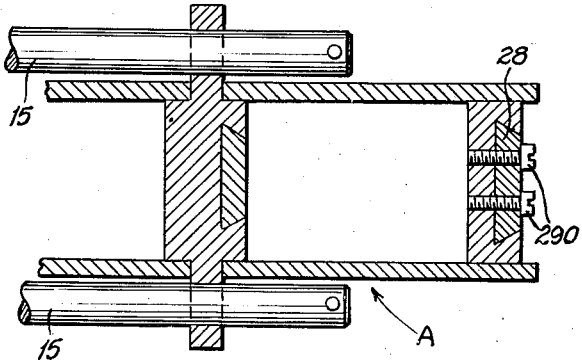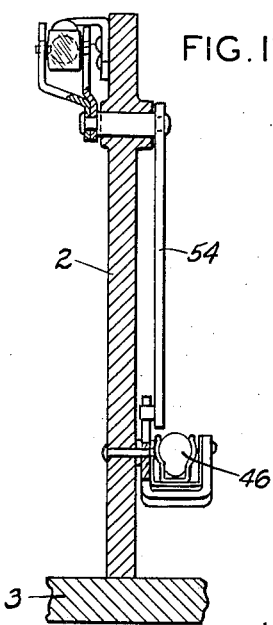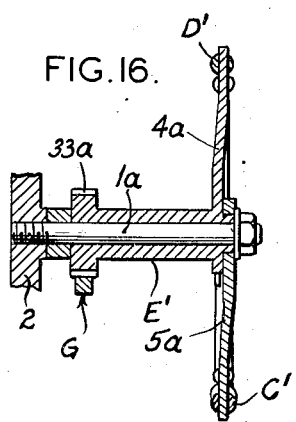

Patented Feb. 5, 1946

2,394,525

UNITED STATES PATENT OFFICE 2,394,525

MACHINE FOR EVERTING BALL CASINGS AND SIMILAR ARTICLES

Richard A. Sopp, St. Louis, Mo., assignor to Rawlings Manufacturing Company, St. Louis, Mo., a corporation of Missouri Application May 7, 1945, Serial No. 592,487

22 Claims. (Cl. 69—1)

This invention relates to a machine for everting or turning inside-out a ball casing or other hollow, shell-like article provided with a slit or opening, and made up of a plurality of sections or pieces of flexible material that are joined together, preferably by sewing, while said pieces are arranged wrong-side-out, or with their unfinished surfaces on the exterior of the article that is to be turned.

In my pending application Serial No. 549,114, filed August 11, 1944, I have illustrated a machine for everting a ball casing or article of the kind mentioned, wherein the eversion operation is effected by clamping the perimeter or edge portion of the slit in the casing, and thereafter engaging the portion of the casing disposed substantially opposite said slit and pushing said portion into the interior of the article towards said slit and through the same, far enough to turn the casing inside-out. One object of my present invention is to provide a machine for everting a ball casing or similar article, that operates on an entirely different principle from the machine disclosed in my said pending application, and which turns the article inside-out by engaging oppositely-disposed portions of the article located on an axis of the article, or approximately the center of same, and pushing said opposed portions into the interior of the article towards each other and then laterally or outwardly through the slit in the article, the article being held against movement during the above described operation by members or devices that frictionally grip opposed portions of the article located at approximately the center of the article or at a point substantially mid-way the slit in the article and the part of the article disposed oppositely to said slit. Preferably, the holding devices that grip the article during the conversion operation, are of such construction that the article being turned will automatically disengage itself from said holding devices during the conversion operation, and preferably, said holding or gripping devices are so constructed and arranged that they form, in effect, a skeleton-like frame that prevents the central portion of the article from bulging or expanding while the opposed portions of the article are being pushed inwardly towards each other and then outwardly through the slit in the article.

Another object of my invention is to provide a machine of the general type first referred to, that simplifies the operation of everting or turning inside-out a ball casing or other hollow, flexible article that is substantially oval-shaped, egg-shaped, or elliptical-shaped.

Another object is to provide a machine that will successfully evert or turn inside-out a sewed ball casing provided with pointed ends, or substantially cone-shaped end portions, that are exceptionally stiff and unyielding, due to the fact that the longitudinally-disposed seams of the casing converge or come together in the end portions of the casing.

Another object is to provide a machine for everting a ball casing or similar article, that can be easily adjusted to adapt it to articles of different sizes or dimensions.

And still another object of my invention is to provide a ball casing everting machine of improved construction, that embodies the desirable characteristics and features of the everting machine shown in my pending application previously referred to.

While the machine herein illustrated is intended to be used primarily for everting or turning a conventional, approximately egg-shaped or pointed end football casing, made up of four elongated sections of leather of substantially oval or ellipsoidal-shape in general outline, joined together by four sewed seams that converge in the tapered or pointed end portions of the casing, I wish it to be understood that my present invention is not limited to a machine for turning a ball casing or other hollow, flexible article of the particular form mentioned, as the general construction and principle of operation of the machine constituting my present invention is applicable to machines for everting numerous different kinds of articles of various shapes and forms.

Briefly stated, my present invention consists of a machine or apparatus for everting a ball casing or other hollow, flexible article provided with a slit, consisting of or comprising a plurality of holding members or gripping devices, two of which are designed or constructed so as to grip opposed portions of the article located at points remote from the slit in the article, and usually at approximately the center or medial line of the article, pushers that are adapted to be engaged with opposed portions of the aricle located at opposite ends of the portions of the article which said holding or gripping devices engage, and means for causing said pushers to move said opposed portions of the article inwardly, into the interior of the article, and thence laterally and outwardly through the slit in the article, the lateral, outward movement of said pushers continuing until the article has been turned inside-out. During the above described movement of the pushers, the portions of the article engaged by said gripping or holding devices are progressively disengaged from or pulled out of said gripping devices by the pressure or force which the pushers exert on the article, and while the pushers and the portions of the article engaged by the pushers are moving outwardly through the slit in the article, the slitted portion of the article is subjected to pressure so as to prevent said slitted portion from moving bodily with the pushers and the opposed portions of the article engaged by the pushers. In the machine herein shown the pressure to which the slitted portion of the article is subjected during the conversion operation so as to retard or prevent bodily movement of said slitted portion, is manual pressure produced by the hands of the operative in charge of the machine, but bodily movement of the slitted portion of the article can be retarded or prevented in various other ways without departing from the spirit of my invention. The parts, means or elements of the machine above referred to can be constructed and operated in various ways, without departing from the spirit of my invention, and as previously stated, the machine can be designed so as to evert ball casings and other articles of various shapes or forms, made up of various numbers of sections and joined to each other in various ways. Inasmuch as the machine herein illustrated is designed for use with a substantially egg-shaped or pointed end ball casing, I will hereinafter refer to the article which is to be everted as the "casing," and I will use the term "end portions of the casing" to designate the parts of the casing engaged by the pushers or clamped between the pushers and their co-acting anvils. Also, I will refer to the parts of the casing that are engaged by the holding or gripping devices as the "seam portions" of the casing, the above terminology being used merely for the purpose of simplifying the description of my invention and not for the purpose of restricting or limiting my invention to a machine for everting an article provided with pointed ends and of substantially egg shape in general outline, as herein illustrated.

Figure 1 of the drawings is a top plan view of an everting machine embodying my present invention, designed for use on a substantially oval-shaped, egg-shaped, or pointed end ball casing, the holding frame in which the casing is held during the eversion operation being shown in its receiving position, i. e., in the position which it occupies at the time the casing is placed in the holding frame preparatory to setting the machine in operation to cause the pushers to perform their function.

Figure 2 is a fragmentary front elevational view of the machine, showing the gripping members or gripping devices on the holding frame opened up and in readiness to receive the casing, and also showing the anvils in the position they occupied at the completion of the previous eversion operation.

Fig. 3 is a fragmentary front elevational view, showing the casing clamped in the holding frame and the pushers arranged in engagement with the end portions of the casing.

Figure 4 is a view similar to Figure 3, but showing the anvils positioned inside of the casing and in locked relationship with the pushers, so as to clamp the end portions of the casing between the anvils and pushers.

Figures 5, 6 and 7 are fragmentary views, illustrating the action of the pushers and anvils during the eversion operation, Figure 5 showing the pushers after they have moved inwardly towards the center of the casing to force the end portions of the casing towards each other, Figure 6 showing how the left hand pusher and its co-acting anvil remain at rest while the right hand pusher and its co-acting anvil move laterally, outwardly to push the right hand portion of the casing outwardly through the slit in the casing, and Figure 7 showing the position of the two pushers and their co-acting anvils at the completion of the eversion operation.

Figures 8, 9, 10 and 11 are views illustrating various positions of the rack bar, the locking devices thereon and the members on the oscillating sleeves that carry the anvils, during the eversion operation.

Figure 1:
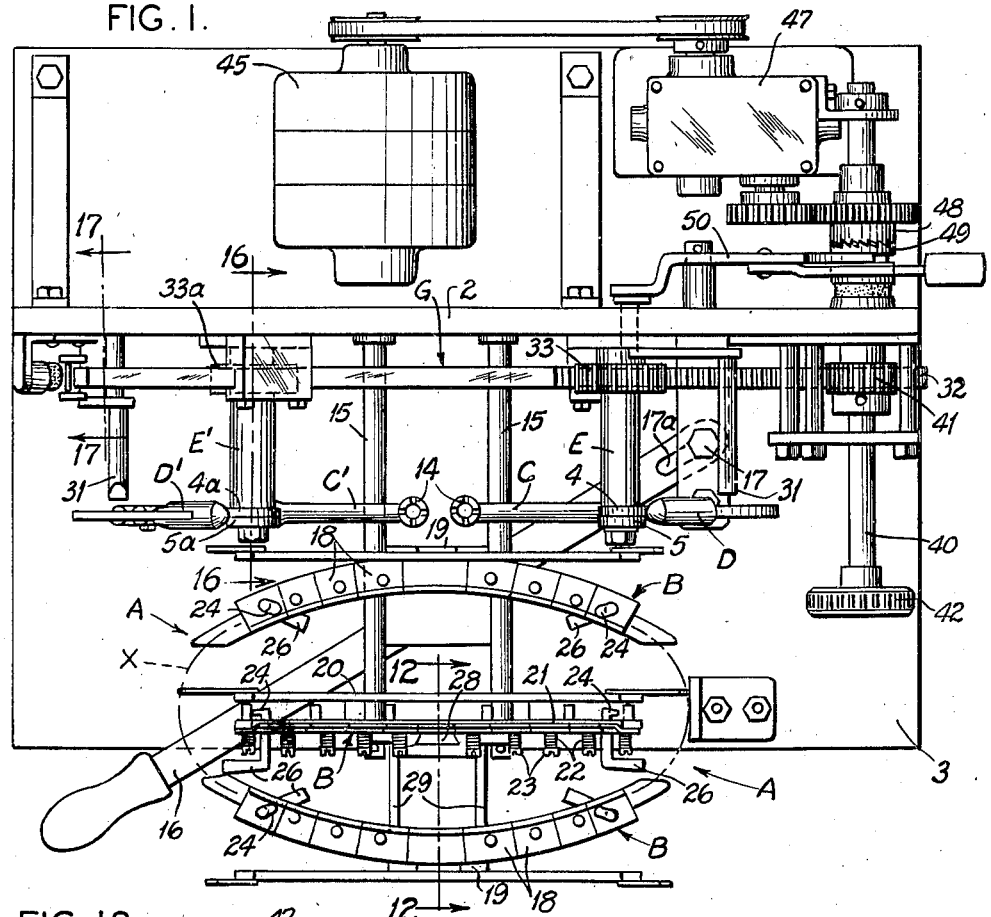

Figure 12 is a vertical sectional view, taken on the line 12—12 of Figure 1, for the purpose of illustrating how the frictional gripping devices on the holding frame of the casing can be adjusted to adapt the machine to articles of different sizes.

Figure 13 is a horizontal sectional view, taken on the line 13—13 of Figure 12.

Figure 14 is a detail sectional view, illustrating the spring action of the individual fingers of the casing gripping devices.

Figure 15 is a detail sectional view of the two opposed jaw portions of one of the casing gripping devices, illustrating the means used to lock or hold said jaw portions together to frictionally clamp or hold the seam portions of the casing during the eversion operation.

Figure 16 is a sectional view, taken on the line 16—16 of Figure 1.

Figure 17 is a sectional view, taken on the line 17—17 of Figure 1; and

Figure 18:
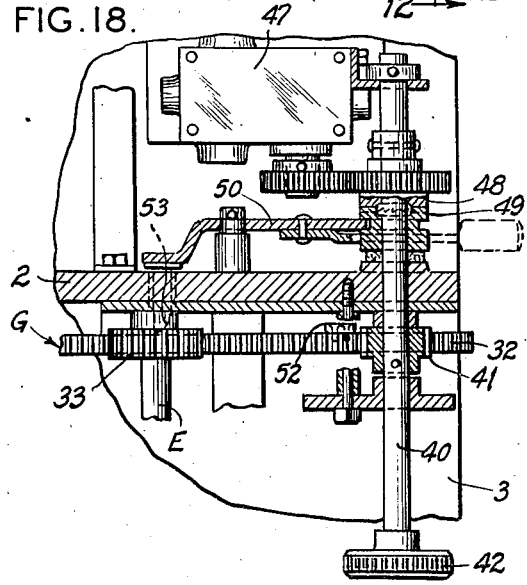

Figure 18 is a fragmentary view, partly in horizontal section, for the purpose of more clearly illustrating the construction of the mechanism used to manually move the rack bar and to couple or engage the rack bar with the power-driven means that actuates the same during the eversion operation. Referring to the drawings, particularly Figures 2 and 3, X designates a conventional oval or elliptical-shaped football casing, made up of four sections of leather or other suitable flexible material, joined together by seams X' that extend longitudinally of the casing at the top, at the bottom, and at the sides of the casing, and which converge in the pointed end portions of the casing, as shown in Figure 3, the seam at the top side of the casing being interrupted so as to produce a slit $X^2$ in the casing, through which a bladder can be inserted in the casing after the casing has been everted or turned inside-out. My improved machine comprises a holding frame for the casing, designated as an entirety by the reference character A, and three holding members or gripping devices on said frame, each of which is designated as an entirety by the reference character B, one of said gripping devices B being arranged so as to frictionally grip the longitudinal seam X' on the underside of the casing, and the other two gripping devices B being arranged in opposed relation, as shown in Figure 1, in a position where they will grip the opposed side seams of the casing that are located intermediate the bottom seam and the slit $X^2$ in the top portion of the casing. During the eversion operation the end portions of the casing are clamped between two pushers C and C' and anvils D and D' that are arranged in opposed relation to said pushers.

The pushers C and C' are herein illustrated as consisting of curved arms that rock about parallel, horizontally-disposed axes, and the anvils D and D' are also formed by curved arms that rock about the said parallel, horizontally-disposed axes. In the machine herein shown the anvils D and D' are rigidly mounted on rockable or rotatable sleeves E and E', respectively, supported by shafts 1 and 1$^a$ that project forwardly from a vertically-disposed support 2 carried by the base plate 3 of the machine, the said sleeve E and E' being arranged parallel, in spaced relation to each other, as shown in Figure 1, and the anvils being rigidly supported on said sleeves by means of rigid arms 4 and 4$^a$ rigidly attached to the front ends of the sleeves. The pushers C and C' are rigidly connected to arms 5 and 5$^a$ that are loosely mounted on reduced portions at the front ends of the sleeves E and E', so as to permit the pushers to be moved towards and away from their co-acting anvils. During the eversion operation the pushers are locked in clamping relationship with the anvils, in a position wherein the pushers and anvils tightly grip the end portions of the casing, by means of a pair of toggle links 6 and 6$^a$, associated with each of the pushers. Each pair of toggle links have their inner ends joined together by a pivot pin 7 and the outer end of the toggle link 6 is pivotally connected to a rigid part 8 on the rock arm that carries the pusher. The outer end of the other toggle link 6$^a$ is pivotally connected to a shiftable part 9 on the rock arm that carries the anvil, and an adjusting screw 10 is provided for changing the position of said shiftable part 9, so as to enable the position of the pusher relatively to its co-acting anvil to be varied when the toggle is straightened to lock the pusher in clamping relationship with the anvil. In the form of my invention herein illustrated, the shiftable piece 9, above referred to, to which the outer end of the toggle link 6$^a$ is pivotally connected, is attached to the anvil supporting arm by a pivot 11. By constructing the locking mechanisms for the pushers in the above described manner, I am able to vary the clamping pressure of the pushers and their co-acting anvils on the end portions of the casing, and I can easily adjust said parts so as to adapt them to casings of different thicknesses. In order to facilitate manipulation of the toggles so as to straighten said toggles to lock the pushers, or to collapse said toggles to release the pushers, the toggle links 6$^a$ are provided with operating handles 12. Movement of the toggle links in a direction to lock the pushers is restricted by means of stops 13 on the rock arms that carry the pushers. The end portions of the anvils are preferably tapered or pointed, and the end portions of the pushers are provided with grooves or notches 14, so as to insure that when the anvils are introduced into the casing, in the operation of clamping the end portions of the casing between the anvils and pushers, the tapered or pointed anvils will cause the seams at the ends of the casing to be seated in the grooves or notches 14 in the pushers C and C'. The operating mechanism for the pushers C and C' and their co-operating anvils D and D', is of such construction that the operative in charge of the machine can manually manipulate the pushers and anvils to cause said parts to clamp the end portions of the casing, after which a power-driven means is set in operation so as to cause the pushers to travel in paths, first inwardly towards each other, and then laterally, so as to force the end portions of the casing outwardly through the slit X$_2$ in the casing, thereby causing the casing to be turned inside-out, as hereinafter more fully explained.

During the eversion operation, above referred to, the casing is frictionally held by the gripping devices B on the casing holder A. Said casing holder A is slidingly mounted on a pair of horizontally-disposed rods 15 arranged in parallel relation to each other, as shown in Figure 1, and projecting forwardly from the vertical support 2 on the bed plate 3 of the machine. The gripping devices B are mounted on said holder in such a way that they form a skeleton-like, elongated frame which is open at its ends so as to provide for the rocking movement of the pushers and their co-acting anvils. A manually-operated lever 16, whose inner end is pivotally attached to the bed plate 3 of the machine by a pivot pin 17 arranged in an enlongated slot 17$^a$ in the inner end of the lever 16, enables the holding frame A of the casing to be shifted into and out of the zone of operation of the pushers, said lever 16 being operatively connected with the casing holding frame A. Each of the gripping devices B comprises a rigid jaw member 18 (see Figures 12, 14 and 15), that is joined by a hinge 19 to a bar 20 that carries a plurality of resilient or spring fingers 21 which constitute a resilient gripping jaw that is arranged in spaced relation with the rigid jaw 18. The member 20, in addition to serving as a support for the spring fingers 21, is of approximately the same thickness as the seam portions X' of the casing, and it acts as an abutment piece that prevents the casing from spreading or expanding when the pushers C and C' push the end portions of the casing inwardly. The parts 20 of the gripping devices B consist of flat bars that are curved longitudinally slightly, so as to conform to the shape or outline of the edges of the seams X' on the casing, and they are rigidly mounted on a portion of the casing holding frame A in such a position that the edge of the bottom seam of the casing bears against the part 20 of the bottom gripping devices B, and the edges of the two side seams X' of the casing bear against the parts 20 of the two side gripping devices B. The spring fingers 21 of each gripping device are preferably formed from a metal plate attached to the part 20 and provided with slots extending inwardly from the free edge portion of said plate that overhangs or projects beyond the edge of the part 20 and which is arranged in opposed relation to the rigid jaw member 18, said slots dividing said plate into a plurality of independent sections 21 that are capable of moving relatively to each other. Each of the resilient fingers 21 has associated with same a spring 22, and adjusting devices 23 are combined with said springs for varying the pressure which said springs exert on the resilient fingers 21. In the operation of positioning the casing in the holding frame A, the rigid jaw members 18 of the gripping devices B are swung on the hinges 19 into a position to permit the casing to be introduced into the holding frame A, with the bottom seam and the two side seams of the casing bearing against the resilient jaws of the gripping devices, formed by the spring fingers 21, and with the edges of said bottom and side seams in contact with the curved bars 20 of the gripping devices. Thereafter, the rigid jaw members 18 of the gripping devices are restored to their normal position, in opposed relation to the spring fingers 21 and are locked in position by manually-operated locking devices located at the opposite ends of the gripping devices B. In the machine herein illustrated each of the gripping devices B is provided at its opposite ends with a locking device 24, carried by a shaft 25 provided with a finger piece 26 for turning said shaft. The shaft 25 is journaled in the part 20 and the rigid jaw member 18 is provided with a hole 27 of such shape that when the shaft is set in a certain position, the locking device 24 can pass through the hole 27 in the rigid jaw member 18, after which the shaft can be turned so as to cause the locking device 24 to clamp and hold the hinged or movable portion of the gripping device in operative relationship with the resilient portion formed by the spring fingers 21.

In order that the machine may be used with ball casings of different sizes, the gripping devices B that engage the side seams of the casing are mounted in such a way that they can be raised and lowered and also moved inwardly and outwardly, or towards and away from the gripping device B that engages the bottom seam of the casing. In the machine herein shown, each of the side seam gripping devices B is mounted on a vertically-adjustable part 28 of the holder that is retained in adjusted position by clamping screws 290, as shown in Figures 12 and 13, that pass through elongated slots in the part 28. By raising or lowering the parts 28, the level or horizontal position of the side seam gripping devices can be varied. The side seam gripping devices are, in turn, adjustably mounted on the vertically-adjustable portions 28 of the holding frame for the casing, and in the machine herein illustrated, the side seam gripping devices B are supported by parallel links 29 on the members 28 that can be swung inwardly and outwardly relatively to the longitudinal axis of the casing holding frame A, so as to increase or decrease the distance between the two gripping devices B that are adapted to be engaged with the side seams of the casing, means being provided to lock the parallel supporting links 29 in adjusted position. In the machine herein shown the links 29 can be locked in a stationary position by tightening the screws 29$^a$ that pivotally support said links.

To install the casing in the holding frame A, said frame is first moved forwardly into the position shown in Figure 1, and the hinged parts of the gripping devices B are moved into what I will term their "open" position, so as to permit the casing to be positioned in the holder with the edges of the bottom seam and the two side seams of the casing in engagement with the rigid, bar-like portions 20 of the gripping devices and with the spring fingers 21 of said gripping devices bearing against one side of the seam portions at the bottom and at the sides of the casing. Thereafter, the hinged jaw portions 18 of the gripping devices are moved into their closed position and locked by manipulating the locking devices 24 at the ends of the gripping devices B. Assuming that the pushers C and C' are at this time in the position shown in Figure 2, the next step is to move the pushers and the anvils into the position shown in Figure 3, so as to permit the casing holder A to be shifted inwardly into a position wherein the casing is disposed in the plane of operation of the pushers and anvils, with the end portions of the casing disposed in alignment with the pushers C and C'. The operator then manually-operates a means which causes the anvils D and D' to move downwardly through the slit $X^2$ in the top side of the casing, so as to clamp the end portions of the casing tightly against the pushers B, which at this time are held at rest in opposed position to the anvils by means of stationary stops 31 on the vertical support 2 on the bed plate, as shown in Figure 4. The toggle links 6 and 6$^a$ associated with the pushers and anvils are then straightened, or moved into the position shown in Figure 4, so as to, in effect, lock the pushers to the anvils D and D' and cause the pushers to move in unison with the anvils when the anvils start on their cycle of operations. During the eversion operation the anvils are moved by a power-driven means which causes the pushers C and C' to push the end portions of the casing inwardly simultaneously, into the position shown in broken lines in Figure 5. After reaching the position shown in Figure 5, the left hand pusher C' and its co-acting anvil D' momentarily come to rest while the right hand pusher C and its co-acting anvil D continue in operation, to push the right hand portion of the casing laterally, outwardly through the slit $X^2$ in the top side of the casing, into the position shown in Figure 6. Thereafter, the left hand pusher and its co-acting anvil resume their operation and push the left hand portion of the casing laterally, outwardly through the slit in the casing, the pushers and anvils finally coming to rest in the position shown in Figure 7, wherein it will be noted that the pushers C and C' are now arranged on the interior of the casing and the anvils D and D' are arranged on the exterior of the casing. During the above described eversion operation, the slitted top portion of the casing is subjected to downward pressure by the hands of the operative in charge of the machine, so as to retard upward movement of the casing or prevent the slitted portion of the casing from moving bodily in an upward direction while the end portions of the casing are being forced through the slit in the casing to turn the casing inside-out. The operator then collapses or breaks the toggles that lock the pushers in clamping relationship with the anvils, whereupon the pushers will separate from the anvils and release the casing, which can then be removed from the pushers and anvils.

The mechanism that is used to move the pushers towards and away from the anvils and also to cause the pushers and anvils to effect the eversion of the casing, comprises a rack bar G provided with racks 32 and 32$^a$, pinions 33 and 33$^a$ on the sleeves E and E' that carry the anvils, adapted to be engaged by the racks 32 and 32$^a$, respectively, a manually-operated means for reciprocating the rack bar G, and a power-driven means for reciprocating said rack bar. As shown in Figures 1 and 2, the rack bar G is disposed transversely of the machine and is arranged in an inclined position, with the rack 32 disposed under the pinion 33 and with the rack 32$^a$ disposed above the pinion 33$^a$. The dwell or momentary stopping of the pushers and their co-acting anvils during the eversion operation, is effected by providing the racks 32 and 32$^a$ with gaps or untoothed portions, and equipping the rack bar G with locking devices 34 and 34$^a$ that are adapted to co-act with members 35 and 35$^a$ attached to the pinions 33 and 33$^a$, respectively. As shown in Figures 8 to 11, inclusive, the locking devices 34 and 34$^a$ consist of laterally-projecting members on the rack bar G, arranged in the zones of the gaps or untoothed portions of the racks 32 and 32$^a$, and provided with straight, flat faces. The members 35 and 35$^a$ that co-act with said locking devices are also provided with straight, flat faces, and said members 35 and 35ª project laterally from the pinions 33 and 33ª and are disposed in the same vertical plane as the locking devices 34 and 34ª. During the longitudinal movement of the rack bar G, whenever the locking device 34 bears squarely on its co-acting member 35 on the pinion 33, the sleeve E will momentarily remain at rest, because there are no teeth on the rack 32 in the zone of the locking device 34. Accordingly, the anvil D and its co-acting pusher C will momentarily remain at rest while the locking device 34 is sliding over its co-acting member 35, inasmuch as the sleeve E functions as a carrier for the anvil D and pusher C, which at this time are clamped to the right hand end portion of the casing. Similarly, when the locking device 34ª on the rack bar G bears squarely on its co-acting member 35ª, and slides over said member 35ª, the anvil D' and pusher C' will momentarily remain at rest.

Figure 8:
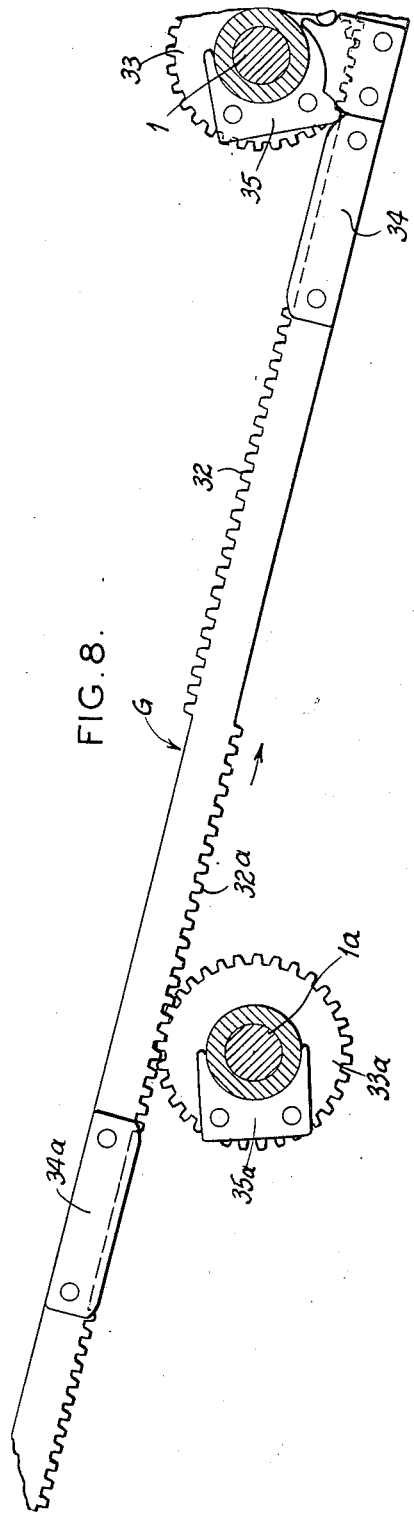
Figure 9:
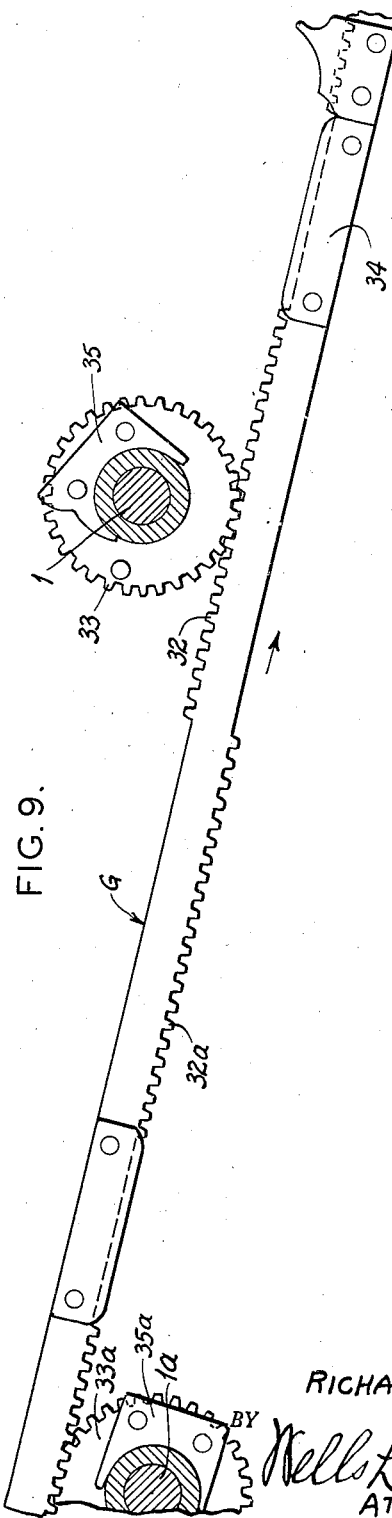

Figures 8, 9, 10 and 11 illustrate the relative positions of the rack bar G, the locking devices 34 and 34ª thereon and the members on the sleeves E and E' that co-act with said locking devices during the eversion operation. Thus, Figure 8 shows the above mentioned co-acting parts at the completion of the eversion operation, when the anvils are in the position shown in Figure 7. Figure 8 also shows the position of the anvils after the turned or everted casing has been disengaged from the anvils and the pushers C and C' have been swung downwardly into the position shown in Figure 2. Preparatory to the next eversion operation, the rack bar G is moved to the right (looking at Figure 8), so as to move the anvils D and D' and the pushers C and C' into the position shown in Figure 3. At this time the pushers are not in locked relationship with the anvils, because the toggle links 6 and 6ª are collapsed, but the pushers will move with the anvils and finally come to rest in engagement with the stops 31 on the vertical support 2 of the machine, as shown in Figure 3. Figure 10 illustrates the relative positions of the rack bar G, the locking devices thereon and the members 35 and 35ª on the sleeves E and E' when the pushers and anvils are in the position shown in Figure 3. Continued movement of the rack bar to the right (looking at Figure 10) causes the anvils to move downwardly or inwardly into the casing into the position shown in Figure 4, so as to clamp the end portions of the casing against the pushers C and C', which at this time are still in engagement with the stationary stops 31 previously mentioned. When the operator straightens the toggle links 6 and 6ª, each pusher will be locked in rigid relationship when its co-acting anvil and the end portions of the casing will be firmly clamped to the pushers. At this time both of the locking devices on the rack bar G are inactive, as shown in Figure 9, and the pushers and anvil occupy the position shown in Figure 4.

During the first portion of the eversion operation the rack bar G moves in the reverse direction, or to the left, and when the pushers and anvils reach the position shown in Figure 5, the locking device 34ª, associated with the left hand pusher, becomes active, as shown in Figure 10, to hold said left pusher and its co-acting anvil at rest. After the right hand pusher moves laterally or outwardly to push the right hand portion of the casing outwardly through the slit in the casing, as shown in Figure 6, the right hand locking device 34 on the rack bar now becomes active to momentarily hold the right hand pusher at rest while the left hand pusher moves laterally, outwardly to force the left hand portion of the casing through the slit in the casing, after which both pushers move in unison into the position shown in Figure 7 to complete the eversion operation. The purpose of constructing the machine so that there will be dwells, or momentary periods of rest, for the pushers and their co-acting anvils, during the cycle of the pushers, is to provide clearance for the end portions of the casing while they are being pushed outwardly through the slit in the casing. The slit $X^2$ in the casing is made only long enough to enable the bladder to be easily inserted in the casing, and accordingly, the slit in the casing is of restricted length. My improved machine takes into account this feature or characteristic of conventional ball casings, and makes it practicable or possible to turn the casing inside-out by pushing first one end portion of the casing through the slit and then pushing the other end portion of the casing through the slit.

As previously stated, a manually-operated means and a power-driven means are provided for operating the rack bar G. The manually-operated means consists of a shaft 40 mounted in suitable bearings on the vertical support 2 of the machine, and provided with a pinion 41, which at all times is in mesh with a toothed portion on the right hand end of the rack bar G. The shaft 40 is provided at its front end with a knob or handle 42 that the operator can grasp to manually rotate the shaft 40, so as to reciprocate the rack bar G to restore the pushers and anvils to starting position at the completion of the eversion operation and also to introduce the anvils into the casing during the operation of clamping the end portions of the casing between the pushers and the anvils. The power-driven means comprises an electric motor 45, controlled by a switch 46, a gear-set 47 driven from said motor, a clutch member 48, a co-acting clutch member 49 keyed to the shaft 40, previously mentioned, and a shifting lever 50 for engaging and disengaging the clutch members 48 and 49. Assuming that the gear-set is in operation, the operator starts the machine by shifting the lever 50 in a direction to engage the clutch members 48 and 49, whereupon the pinion 41 on the shaft 40 will rotate in a direction to cause the rack bar G to move the pushers and their co-acting anvils into the various stages illustrated in Figs. 4, 5, 6 and 7. At the completion of the eversion operation, a stop 52 on the rack bar G (see Figure 18) engages a tripping device 53, associated with the starting lever 50, and moves said starting lever in a direction to disengage the clutch members 48 and 49, whereupon the rack bar G will come to rest. In order to eliminate the possibility of damage to the machine, resulting from failure of the tripping mechanism for the clutch shifting lever 50, I prefer to construct the machine so that the control switch 46 for the motor 45 will open automatically at the end of the eversion operation. In the machine herein shown, when the rack bar G reaches the position shown in Figure 7, said rack bar will impart movement to an actuating device, designated as an entirety by the reference character 54, in Figure 17, so as to shift the control switch 46 into its open position. Thereafter, when the rack bar G is moved manually, to the right, preparatory to installing a casing, in the machine, the switch 46 closes automatically and sets the motor 45 and gear-set in operation.

To recapitulate, the pushers and their co-operating anvils come to rest in the position shown in Figure 7, at the completion of the eversion operation, with the pushers located on the interior of the everted casing and with the anvils located on the exterior of said casing. The operator then collapses the toggle links 6 and 6ª, so as to release the pushers and permit the casing to be disengaged from the pushers and anvils. The operator then manually shifts the casing holding frame A forwardly, into the position shown in Figure 1, and opens the gripping devices B so that the seam on the underside of the casing and the two side seams of the casing can be engaged with the gripping devices B, thereby causing the casing to be held securely in the supporting frame A by gripping devices that comprise groups of spring fingers that frictionally hold the casing, but which permit the casing to progressively disengage itself from the casing holding or gripping means during the eversion operation. During the eversion operation, when the pushers move inwardly towards each other, they exert pressure on the casing in directions tending to cause the central portion of the casing to bulge laterally or outwardly, but in view of the fact that the gripping devices B comprise rigid, curved bars or members 20 that bear against the edges of the bottom seam and side seams of the casing, such tendency to bulge is effectively overcome or prevented. Before the operator shifts the casing holding frame A into the zone of operation of the pushers, the operator manually turns the shaft 40 so as to cause the pushers and anvils to be set in the position shown in Figure 3, after which the pushers are manually operated so as to clamp the end portions of the casing between the pushers and anvils. The clutch control lever 50 is then actuated to cause the shaft 40 to be coupled with the gearset 47, whereupon the rack bar G will move in a direction to cause the pushers and anvils to turn the casing inside-out by first pushing one end portion of the casing through the slit $X^2$ in the casing, and thereafter pushing the other end portion of the casing through said slit.

Having thus described my invention, what I claim as new and desire to secure by Letters Patent is:

1. A machine for everting a ball casing or similar flexible article provided with a slit, comprising a holding means adapted to be engaged with portions of the article that are remote from the slit in the article, pushers that are adapted to be engaged with opposed portions of the article lying adjacent one axis of the article, and an operating mechanism for causing said pushers to move the opposed portions of the article inwardly into the interior of the article, and then laterally, outwardly through the slit in the article, thereby turning the article inside-out.

2. A machine of the kind described in claim 1, in which the operating mechanism for the pushers has provision for enabling the pushers to be moved manually into and out of engagement with the article.

3. A machine of the kind described in claim 1, in which the operating mechanism for the pushers has provision for causing one portion of the article engaged by one pusher, to be forced outwardly through the slit in the article, after which the opposed portion of the article engaged by a different pusher is forced outwardly through the slit.

4. A machine of the kind described in claim 1, in which the holding means for the article frictionally grips the article and permits the article to progressively disengage itself from said holding means during the eversion operation.

5. A machine of the kind described in claim 1, provided with means for causing the pushers to be firmly clamped to the portions of the article on which said pushers exert pressure during the eversion operation.

6. A machine for everting a ball casing or similar flexible article, provided with a slit, comprising a holding means that frictionally grips a portion of the article disposed oppositely to said slit and also side portions of the article located some distance away from said slit, two members that are adapted to be positioned inside of the article in engagement with opposed portions of the article lying at the ends of the center axis of the article, means for clamping said opposed portions to said members, and an operating mechanism for moving said members in paths that cause the opposed portions of the article to move inwardly into the interior of the article and then outwardly through the slit in the article, whereby the article will be turned inside-out.

7. A machine of the kind described in claim 6, in which said operating mechanism has provision for producing dwells or momentary periods of rest in said members, during the cycle of operations of said members.

8. A machine of the kind described in claim 6, in which the holding means that frictionally grips the article is carried by a shiftable frame that is adapted to be moved into and out of the zone of operation of the members that effect the eversion of the article.

9. A machine for everting a ball casing or similar flexible article provided with a slit, comprising members that are adapted to be positioned inside of the article in engagement with opposed portions of the article, means for clamping said opposed portions to said members, means for moving said members in arc-shaped paths so as to draw the opposed end portions of the article inwardly towards each other and then force said portions outwardly through the slit in the article, and a friction holding means for the article, constructed so that the article will progressively disengage itself from same to accommodate the movement of the members to which the opposed portions are clamped, during the eversion operation.

10. A machine for everting a ball casing or other flexible article provided with a slit, comprising anvils adapted to be positioned inside of the article in engagement with opposed portions of the article lying at the ends of the center axis of the article, rockable carriers for said anvils, pushers adapted to be engaged with the external portions of the article engaged by the anvils, means for locking said pushers in clamped relationship with said anvils, an operating mechanism for the anvil carriers, and a holding means for the article that frictionally grips portions of same, disposed at points remote from the slit in the article.

11. A machine of the kind described in claim 10, in which the operating mechanism for the anvils has provision for producing dwells or momentary periods of rest in the anvils at different times during the cycle of operations of the anvils.

12. A machine for everting a ball casing or similar flexible article provided with a slit, comprising a holding frame provided with gripping devices that are adapted to be engaged with a plurality of portions of the article located at points remote from the split in the article, rockable anvils adapted to be positioned on the interior of the article in engagement with opposed portions of the article lying in the center axis of the article, rockable pushers adapted to be positioned on the exterior of the article in opposed relation to said anvils, a manually-operable means for clamping the opposed portions of the article against said anvils and for causing the pushers to move in unison with the anvils, and means for imparting movement to the anvils and to the co-operating pushers in directions to cause the opposed portions of the article clamped between the anvils and pushers to move into the interior of the article and then outwardly through the slit in the article, thereby everting the article.

13. A machine of the kind described in claim 12, in which the operating mechanism for the anvils comprises a manually-operable means for setting the anvils in certain positions, and a power-driven means that imparts movement to the anvils during the eversion operation.

14. A machine for everting a ball casing or similar article provided with a slit, comprising anvils that are adapted to be positioned inside of the article in engagement with opposed portions of the article lying at the ends of the center axis of the article, rockable pushers adapted to be engaged with the exterior of the article to clamp the same to the anvils, rockable sleeves that carry the anvils and the pushers, means for locking the pushers and anvils in clamped relationship with each other and in rigid relationship with the sleeves, a rack and pinion mechanism for rocking said sleeves so as to cause the opposed portions of the article to move inwardly towards each other and then laterally, outwardly through the slit in the article, and a holding means in which the article is positioned during the eversion operation.

15. A machine of the kind described in claim 14, in which said rack and pinion mechanism has provision for causing both sleeves to move in unison and to cause one sleeve to remain at rest momentarily while the other sleeve continues in operation.

16. A machine of the kind described in claim 14, in which said locking means comprises adjustable toggles.

17. A machine of the kind described in claim 14, in which the holding means for the article comprises a plurality of frictional gripping devices, each of which is made up of a rigid jaw arranged in opposed relation to a plurality of spring gripping fingers.

18. A machine for everting a ball casing or similar flexible article provided with a slit, comprising a holding frame provided with a plurality of frictional gripping devices adapted to be engaged with the bottom and with the side portions of the article, means for enabling said gripping devices to be adjusted to adapt them to articles of different sizes, members adapted to be clamped to opposed portions of the article located at opposite ends of the parts of the article gripped by said gripping devices, and means for imparting movement to said members in directions to cause the article to be progressively disengaged from said gripping devices and the opposed portions of the article engaged by said members to move inwardly towards each other and then outwardly through the slit in the article.

19. A machine for everting an egg-shaped or pointed end ball casing provided with a slit and made up of a plurality of pieces of material joined together by seams, comprising elongated gripping devices arranged so as to frictionally grip the bottom seam and the side seams of the casing, and means for exerting pressure on the end portions of the casing in a direction to push said end portions inwardly into the interior of the casing and then laterally, outwardly through the slit in the casing.

20. A machine for everting a substantially egg-shaped or pointed end ball casing provided with longitudinally-disposed seams, comprising a holding means that frictionally grips a plurality of the seams of the casing, pushers and co-acting anvils adapted to be clamped to the opposed end portions of the casing, and mechanism for moving said pushers and anvils so as to in effect collapse the casing endwise, move one end portion of the casing through the slit in the casing and thereafter move the other end portion of the casing through said slit, thereby turning the casing inside-out.

21. A machine of the kind described in claim 20, in which said gripping devices each comprises a plurality of resilient fingers that progressively release the seam of the casing engaged by same during the eversion operation.

22. A machine for everting a substantially egg-shaped or pointed end ball casing provided with a slit, comprising a shiftable holding frame equipped with a plurality of frictional gripping devices that are adapted to be engaged with the side seams and the bottom seam of the casing, tapered end anvils adapted to be positioned inside of the casing in engagement with the opposed end portions of the casing, pushers arranged in opposed relation to said anvils for clamping the casing to the anvils, and an operating mechanism for imparting movement to the anvils and pushers in directions to progressively disengage the seam portions of the casing from said gripping devices and cause the ends of the casing to be moved inwardly into the interior of the casing and then outwardly through the slit in the casing, said operating mechanism having provision for enabling it to be manually-operated and mechanically driven.

RICHARD A. SOPP.